United States Patent [19]

Jacob-Grinschgl et al.

[11] Patent Number: 4,855,538
[45] Date of Patent: Aug. 8, 1989

[54] MEASURING TABLE FOR CO-ORDINATE MEASURING SYSTEM

[75] Inventors: Wolfgang Jacob-Grinschgl, Munich; Udo Müller, Unterschleissheim, both of Fed. Rep. of Germany

[73] Assignee: Kontron Holding A.G., Zurich, Switzerland

[21] Appl. No.: 104,579

[22] Filed: Oct. 2, 1987

Related U.S. Application Data

[63] Continuation of Ser. No. 841,415, Mar. 19, 1986, abandoned.

[30] Foreign Application Priority Data

Apr. 1, 1985 [DE] Fed. Rep. of Germany ....... 3511863

[51] Int. Cl.$^4$ ............................................. G08C 21/00
[52] U.S. Cl. ........................................ 178/18; 178/19
[58] Field of Search ................................... 178/18, 19

[56] References Cited

U.S. PATENT DOCUMENTS

| | | | |
|---|---|---|---|
| 3,466,646 | 9/1969 | Lewin | 178/19 |
| 3,647,963 | 3/1972 | Bailey | 178/19 |
| 3,699,253 | 10/1972 | Freedman | 178/19 |
| 3,700,809 | 10/1972 | Nadon | 178/18 |
| 3,725,760 | 4/1973 | Bailey | 318/568 |
| 3,735,044 | 5/1973 | Centner et al. | 178/19 |
| 3,801,733 | 4/1974 | Bailey | 178/19 |
| 3,846,580 | 11/1974 | Brenner | 178/19 |
| 3,873,770 | 3/1975 | Ioannou | 178/18 |
| 3,904,821 | 9/1975 | Whetstone et al. | 178/19 |
| 3,904,822 | 9/1975 | Kamm et al. | 178/19 |
| 4,054,746 | 10/1977 | Kamm | 178/19 |
| 4,080,515 | 3/1978 | Anderson | 178/19 |
| 4,088,842 | 5/1978 | Ikedo | 178/19 |
| 4,206,314 | 6/1980 | Prugh et al. | 178/19 |
| 4,497,977 | 2/1985 | Saito et al. | 178/19 |
| 4,582,955 | 4/1986 | Blesser | 178/19 |

OTHER PUBLICATIONS

Grover, D., "Graphics Tablets-A Review", Displays, vol. I, No. 2, (1979).
Takeda et al., "A New Data Tablet Superposed By a Plasma Display Panel", National Communications Conference, New Orleans, LA, Nov. 29–Dec. 3, 1981.
U.S. patent application Ser. No. 841,507, Filed Mar. 19, 1986, to Grinschgl et al.

*Primary Examiner*—Stafford D. Schreyer
*Attorney, Agent, or Firm*—Jon S. Saxe; Bernard S. Leon; George W. Johnston

[57] ABSTRACT

A digitizer comprising a measuring table having a substrate on which a grid is mounted, and a movable coil inductively coupled to the gird. When a time variable current is applied, a variable magnetic flux produces a measuring signal in the form of an induced voltage. The grid is a plurality of side-by-side, parallel conductors, each having opposite axial ends and arranged in pairs. A bridge is provided between adjacent ends of a plurality of the pairs of conductors. Current flowing into the opposite end of one conductor of a pair of conductors, thus, produces oppositely directed magnetic fields around the conductors of the pair, or a changing magnetic flux produced by the coil and interacting with the conductors of a pair induces voltages of opposite polarity in the conductors of the pair.

5 Claims, 1 Drawing Sheet

U.S. Patent   Aug. 8, 1989   4,855,538

MEASURING TABLE FOR CO-ORDINATE MEASURING SYSTEM

This is a continuation of application Ser. No. 841,415, filed 3-19-86, abandoned.

TECHNICAL FIELD

This invention relates to a measuring table or digitizer for a co-ordinate measuring system used to determine the position of a coil member relative to a grid member inductively coupled thereto and mounted on the measuring table.

BACKGROUND ART

In a known co-ordinate measuring system, a switching circuit is constructed and arranged to produce a measuring signal in the form of a train of induced pulses in one of the members when a time variable current is applied to the other of the members. In order to produce the measuring signal, the switching circuit sequentially connects, or activates, each of the grid conductors to a common circuit for only a predetermined period of time during a sampling cycle of all the conductors. When the common circuit is connected to a constant current source, operation of the switching circuit sequentially applies unidirectional current pulses to the conductors of the grid member causing a measuring signal in the form of a train of pulses to be induced in the coil member. On the other hand, when a time variable current (e.g., an alternating current) is applied to the coil, a voltage is induced in each conductor; and operation of the switching circuit causes a measuring signal, in the form of a train of pulses, to appear in the common circuit or bus.

The position of the coil member relative to the grid member can be determined by processing the measuring signal in an evaluator circuit. Specifically, the evaluator circuit sequentially differentiates the measuring signal to yield a voltage whose second zero-axis crossing specifies the coordinates of the coil relative to the table.

An object of the present invention is to provide a new and improved measuring table for a co-ordinate measuring system which simplifies the evaluator circuit.

BRIEF DESCRIPTION OF THE INVENTION

A coordinate measuring system according to the present invention comprises a measuring table having a substrate on which a grid member is mounted, and a moveable coil member inductively coupled to the grid member. Means are provided for applying to one of the members a time variable current that produces a variable magnetic flux that interacts with the other member producing therein a measuring signal in the form of an induced voltage.

According to the present invention, the grid member comprises a plurality of side-by-side, parallel conductors, each having opposite axial ends and arranged in pairs. Separate bridges connect adjacent ends of a plurality of said pairs of conductors whereby current flowing into the opposite end of one conductor of a pair of conductors produces oppositely directed magnetic fields around the conductors of the pair, or, a changing magnetic flux produced by the coil member and interacting with the conductors of a pair induces voltages of opposite polarity in the conductors of the pair.

If the spacing between the conductors of a pair of conductors is sufficiently small, and if the conductors are activated in pairs instead of individually, the measuring signal produced in the coil member will be once-differentiated in comparison with the signals generated by conventional measuring tables in which the conductors are activated individually instead of in bridged pairs. In other words, the voltage induced in the coil member by oppositely directed magnetic fields arising from the flow of current through each of the pairs of conductors is effectively once-differentiated.

On the other hand, the opposite voltages induced in the pairs of conductors by a changing magnetic flux produced by a time varying current applied to the coil member results in a measuring signal produced by the pairs of conductors which is effectively once-differentiated. In either case, the evaluation circuit used with a measuring table according to the present invention need be designed to effect only one differentiation of the measuring signal to determine the position of the coil relative to the grid rather than two differentiations to obtain an optimum signal.

Preferably, each of the bridged pairs of conductors forms a grid coil of at least one turn. The bridged grid conductors of each pair may also form a grid coil comprising a plurality of turns. When the pairs of grid conductors are used as transmitters in the latter arrangement, and the coil member is used as a receiver, a smaller current in the grid conductors is required to obtain a given magnetic flux. On the other hand, when the coil member is used as a transmitter, and the pairs of conductors are used as receivers, a higher induction voltage, and hence a larger measuring signal, will result. Preferably, each of the grid coils have an equal number of turns that extend transversely to the co-ordinate direction defined by the grid member.

According to one advantageous development, the grid coils are disposed in overlapping relationship. This configuration increases the accuracy with which the position of the coil member relative to the grid member is determined by the evaluator circuit.

In one very favorable embodiment of the overlapping relationship, the grid coils are in the form of conductive tracks carried on a thin, non-conductive substrate such as a foil, and a plurality of such foils are stacked one above the other in staggered relationship.

BRIEF DESCRIPTION OF THE DRAWINGS

Embodiments of the invention are described below with reference to the accompanying diagrammatic drawings, wherein.

DETAILED DESCRIPTION

Figure 1:
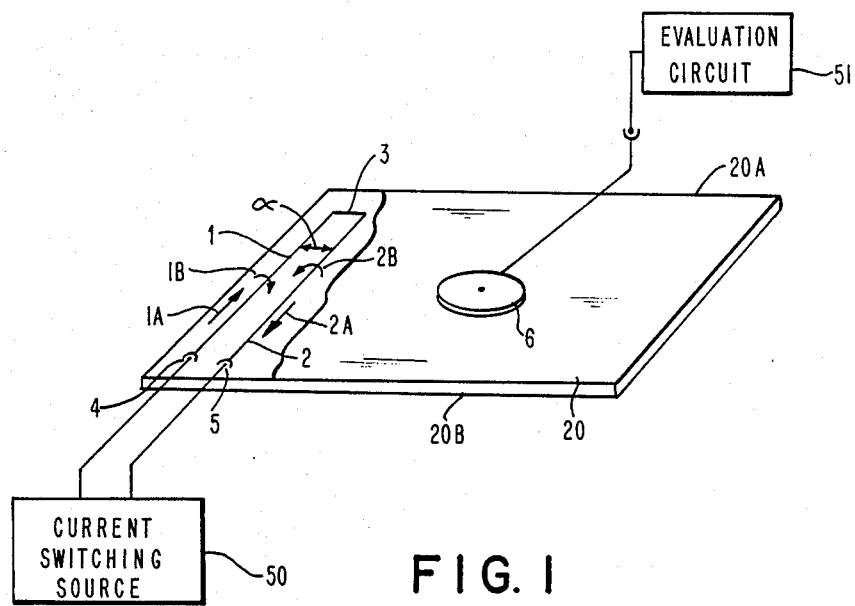
FIG. 1 is a schematic view of a measuring table according to the present invention.

Referring now to FIG. 1, a co-ordinate measuring system according to the present invention is shown as comprising moveable coil member 6, and measuring table 20 carrying a grid member inductively coupled to coil 6. The grid member comprises a plurality of side-by-side, parallel conductors each of which has opposite axial ends that are respectively adjacent opposite sides 20A and 20B of table 20. The conductors are arranged in pairs, one of which, comprising conductors 1 and 2, is shown in FIG. 1. Bridge 3 constitutes a connection between adjacent ends of conductors 1 and 2. Actually, the entire area of table 20 is covered by pairs of bridged conductors as indicated in FIG. 2.

Figures 2, 3:
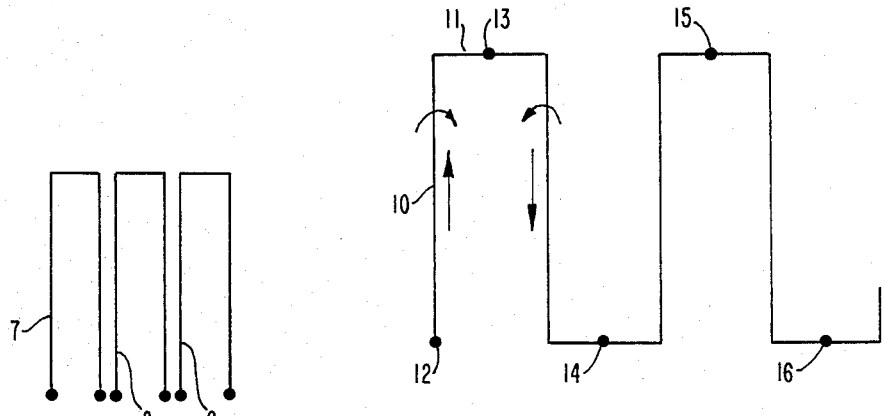
FIG. 2 is a plan view of a grid member of a measuring table showing the grid conductors positioned side-by-side and arranged in pairs, adjacent ends of each of the pairs being interconnected much like a hairpin.
FIG. 3 is another embodiment of the grid member shown in FIG. 2, such embodiment showing a meandering pattern of grid conductors.

As can be seen from FIGS. 1 and 2, the grid member is a plurality of individually separate grid lines wherein each grid line comprises at least two side-by-side, parallel conductors, each having opposite ends that are respectively adjacent opposite sides of table 20.

In addition to table 20 and coil 6, the coordinate measuring system includes current switching source 50 connected to terminals 4 and 5 of bridged conductor pair 1, 2, 3 (and to other pairs on the table), and evaluation circuit 51 connected to coil 6. Source 50 contains a constant current source; and in a conventional manner, sequentially connects the source for a limited time interval to each of the pairs of conductors during a switching cycle. The flow of current in the direction of arrow 1A in conductor 1 produces a magnetic flux around the conductor in the direction indicated by arrow 1B; and the flow of current in conductor 2 produces a magnetic flux around that conductor in the direction indicated by arrow 2B. These two magnetic fluxes, produced by the flow of current in conductors 1 and 2, are oppositely directed with respect to coil 6, but do not cancel because the grid conductors 1 and 2 are spaced apart a distance a so that the grid conductors of a pair are located at different distances from the coil. As shown in FIG. 1, conductor 2 is closer to coil 6 than conductor 1 with the result that a net flux due to the flow of current in the pair of conductors induces a voltage in the coil.

FIG. 2 shows measuring table with three adjacent pairs 7, 8, and 9 of conductors each of which is bridged at adjacent ends. In actual fact, some 10 to 100 pairs of grid conductors for each co-ordinate direction are provided on a measuring table, depending on its size, and the desired measuring accuracy.

On sequential application of unidirectional pulses of current (i.e., energization or activation) of grid conductor pairs 7, 8, and 9, the magnetic fluxes produced by the flow of current in the pairs is coupled to coil 6 inducing a voltage therein that corresponds to the first derivative of the measuring signal that would be obtained if the bridging between the conductor pairs were omitted and the same current would flow through the individual conductors of the pairs (which is the conventional technique for carrying out measurements in known measuring tables). Because each conductor of a pair has current flowing in opposite directions, a differentiating effect occurs in the voltage induced in coil 6. The accuracy of the differentiation depends primarily on the distance a between the connected pairs of grid conductors.

FIG. 3 shows a different arrangement of the grid conductors which form a single meandering conductor path 10 having connections 12, 13, 14, 15 and 16 at bridging conductor portions 11 connecting the grid conductors of the pairs. In the operation of this system, connections 12 and 14, connections 13 and 15, connections 14 and 16, etc. are successively connected across a power supply. It will be apparent that the current flowing in each conductor of a pair will be in opposite directions.

Figures 4, 5:
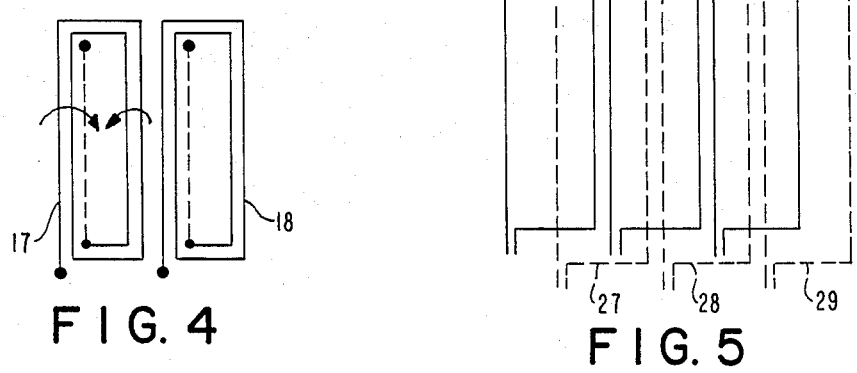
FIG. 4 is still another embodiment of the grid member shown in FIG. 2, the pairs of conductors in this embodiment being in the form of multiple-turn grid coils.
FIG. 5 is another embodiment of the grid member shown in FIG. 4, such embodiment showing the pairs of grid conductors in the form of single-turn grid coils arranged in overlapping arrangement.

In the embodiments described above, each of the pairs of bridged conductors effectively defines a single-turn grid coil. FIG. 4 shows another embodiment in which each of the pairs of bridged grid conductors form a grid coil of more than one turn. Specifically, each of multi-turn grid coils 17 and 18 is larger than single-turn grid coil 7, for example. Consequently, the current required to generate a given magnetic flux through the grid conductors is reduced using the arrangement shown in FIG. 4, and the control circuits are less expensive as a consequence.

FIG. 5 diagrammatically illustrates another embodiment of a measuring table in which six grid coils are each disposed with one turn overlapping another. Grid coils 24, 25, and 26 lie in a first plane, which grid coils 27, 28, 29 lie in a different plane. Such an arrangment of the grid coils can be obtained by forming the grid coils as conductive tracks carried on a non-conductive substrate. That is to say, the grid coils are in the form of conductive paths deposited following conventional techniques on separate foils; and the foils are then stacked in staggered relationship. Specifically, grid coils 27, 28 and 29 are offset from the grid coils 24, 25, and 26. Activation of the coils is in the sequence 24, 27, 25, 28, 26, 29.

The invention described above deals with using the grid member as a transmitter and the coil 6 as a receiver; but the opposite is also within the scope of the invention. In such case, an alternating current is applied to coil 6, and the induced voltage in the pairs of conductors is sequentially connected to an evaluator circuit.

The invention can also be applied together with the concurrently filed parallel invention entitled "Co-ordinate Measuring System," which in turn has a once differentiating effect and which gives a double differentiation in combination with the invention described above.

We claim:

1. In a coordinate measuring system, a measuring table carrying a grid member in the form of a plurality of individually separate grid lines; a moveable coil member inductively coupled to the grid member; and means for applying to one of the members a time variable current that produces a variable magnetic flux that interacts with the other member producing therein a measuring signal in the form of an induced voltage; the improvement wherein each grid line comprises at least two side-by-side, parallel conductors, each having opposite ends that are respectively adjacent opposite sides of the table and separate bridges between respective pairs of conductors so that current flowing in a pair of bridged conductors produces oppositely directed magnetic fields around the conductors of the pair, or a changing magnetic flux produced by the coil and interacting with the conductors of a pair induces voltages of opposite polarity in the conductors of the pair, and said bridged pairs of conductors form a grid coil having more than one turn.

2. A coordinate measuring system comprising:
  (a) a measuring table having opposite sides, said table comprising a substrate on which a grid member is mounted;

(b) a moveable coil member inductively coupled to the grid member;

(c) means for applying to one of the members a time variable current that produces a variable magnetic flux that interacts with the other member producing therein a measuring signal in the form of an induced voltage;

(d) said grid member comprising a plurality of individually separate grid lines having at least two side-by-side, parallel conductors, each having opposite ends that are respectively adjacent opposite sides of the table, said conductors being arranged in pairs; and (e) a connection being located between respective ends of a plurality of said pairs of conductors so that current flowing in a pair of conductors and its connection produces oppositely directed magnetic fields around the conductors of the pair, or a changing magnetic flux produced by the coil and interacting with the conductors of a pair induces voltages of opposite polarity in the conductors of the pair, and said bridged pairs of conductors form a grid coil having more than one turn.

3. The coordinate measuring system according to claim 2, wherein each grid coil has the same number of turns.

4. The coordinate measuring system according to claim 3, wherein each of the grid coils overlap.

5. The coordinate measuring system according to either of claims 3 or 4 wherein the conductors are in the form of conductive tracks carried on badly-conductive substrate, and a plurality of the last mentioned substrates are stacked in staggered relationship.

* * * * *